United States Patent
Schulte et al.

(10) Patent No.: US 7,467,555 B2
(45) Date of Patent: Dec. 23, 2008

(54) PRESSURE TRANSMITTER WITH MULTIPLE REFERENCE PRESSURE SENSORS

(75) Inventors: John Schulte, Eden Prairie, MN (US); Mark Romo, Eden Prairie, MN (US); Stanley E. Rud, Jr., Victoria, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/483,977

(22) Filed: Jul. 10, 2006

(65) Prior Publication Data

US 2008/0006094 A1     Jan. 10, 2008

(51) Int. Cl.
*G01L 13/02* (2006.01)
*G01L 15/00* (2006.01)

(52) U.S. Cl. .......................................... 73/736; 73/753

(58) Field of Classification Search .......... 73/700–756; 361/283.1–283.4
See application file for complete search history.

(56) References Cited

U.S. PATENT DOCUMENTS

| | | | | |
|---|---|---|---|---|
| 3,735,639 A | | 5/1973 | Akeley ........................ 73/728 |
| 3,894,435 A | | 7/1975 | Shimada et al. .............. 73/721 |
| 4,086,815 A | * | 5/1978 | Asano et al. ................. 73/721 |
| 4,131,088 A | | 12/1978 | Reddy ..................... 123/32 EJ |
| 4,466,290 A | * | 8/1984 | Frick ............................ 73/756 |
| 4,572,000 A | * | 2/1986 | Kooiman ..................... 73/718 |
| 4,598,381 A | | 7/1986 | Cucci ......................... 364/558 |
| 4,667,284 A | | 5/1987 | Asami ......................... 700/82 |
| 4,776,218 A | * | 10/1988 | Sawa et al. ................... 73/721 |
| 4,790,192 A | | 12/1988 | Knecht et al. ................. 73/721 |
| 4,818,994 A | | 4/1989 | Orth et al. .............. 340/870.21 |
| 4,949,581 A | | 8/1990 | Rud, Jr. ........................ 73/706 |
| 5,022,270 A | | 6/1991 | Rud, Jr. ........................ 73/706 |
| D358,782 S | | 5/1995 | Louwagie et al. ............ D10/96 |
| 5,493,512 A | | 2/1996 | Peube et al. ................. 364/510 |
| 5,495,769 A | | 3/1996 | Broden et al. ................ 73/718 |
| 5,531,120 A | | 7/1996 | Nagasu et al. ................ 73/706 |
| 5,583,294 A | * | 12/1996 | Karas .......................... 73/706 |
| 5,606,513 A | | 2/1997 | Louwagie et al. ........... 364/510 |
| 5,616,861 A | | 4/1997 | Hagen ......................... 73/180 |

(Continued)

FOREIGN PATENT DOCUMENTS

WO    WO 98/10249    9/1997

(Continued)

OTHER PUBLICATIONS

Official Search Report of Written Opinion in foreign application No. PCT/US2007/010649 filed May 2, 2007.

(Continued)

*Primary Examiner*—Andre J. Allen
*Assistant Examiner*—Jermaine Jenkins
(74) *Attorney, Agent, or Firm*—Christopher R. Christenson; Westman, Champlin & Kelly (57) ABSTRACT

Reliability and accuracy in a pressure measurement transmitter are provided by employing a plurality of absolute or gauge pressure sensors operating in conjunction with a differential pressure sensor. A method is also provided to perform diagnostics based upon the readings of the three pressure sensors. Further, should one of the three pressure sensors fail, a reasonable estimate of process pressure being measured by the failed sensor can be generated based upon the remaining two sensors.

23 Claims, 5 Drawing Sheets

U.S. PATENT DOCUMENTS

| | | | |
|---|---|---|---|
| 5,637,802 A | 6/1997 | Frick et al. | 73/724 |
| 5,672,832 A * | 9/1997 | Cucci et al. | 73/861.52 |
| 5,680,109 A | 10/1997 | Lowe et al. | 340/608 |
| 5,764,928 A | 6/1998 | Lanctot | 395/285 |
| 5,870,695 A | 2/1999 | Brown et al. | 702/138 |
| 5,899,962 A | 5/1999 | Louwagie et al. | 702/138 |
| 6,016,706 A | 1/2000 | Yamamoto et al. | 73/727 |
| 6,023,978 A | 2/2000 | Dauenhauer et al. | 73/720 |
| 6,089,097 A | 7/2000 | Frick et al. | 73/718 |
| 6,176,262 B1 | 1/2001 | Nimberger | 137/597 |
| 6,473,711 B1 | 10/2002 | Sittler et al. | 702/138 |
| 6,484,585 B1 * | 11/2002 | Sittler et al. | 73/718 |
| 6,508,131 B2 | 1/2003 | Frick | 73/756 |
| 6,631,644 B2 * | 10/2003 | Burczyk et al. | 73/716 |
| 6,907,790 B2 | 6/2005 | Orth et al. | 73/753 |
| 7,284,437 B2 * | 10/2007 | Krippner et al. | 73/716 |
| 2003/0205089 A1 | 11/2003 | Nelson et al. | 73/715 |

FOREIGN PATENT DOCUMENTS

| | | |
|---|---|---|
| WO | WO 01/13083 | 2/2001 |
| WO | WO 01/23972 | 4/2001 |

OTHER PUBLICATIONS

I/A Series Multirange Pressure Transmitters, Invensys Systems, Inc., 2002, 2 pages.

Product Data Sheet, Rosemount 3095 MultiVariable Transmitter with MODBUS Protocol, Aug. 2004, pp. 1-20.

\* cited by examiner

FIG. 5

PRESSURE TRANSMITTER WITH MULTIPLE REFERENCE PRESSURE SENSORS

BACKGROUND OF THE INVENTION

In fluid process control applications in chemical, pulp, food, and other fluid processing plants, different types of pressure transmitters are used. These types generally include absolute pressure transmitters that measure a process pressure relative to a vacuum; gauge pressure transmitters that measure a process pressure relative to local atmospheric pressure; and differential pressure transmitters that measure a difference between two process pressures. Pressure transmitters also typically measure pressure over a limited range with a specified accuracy. Typically a pressure transmitter will be manufactured in two or more overlapping ranges, each specified to measure pressure accurately over about a 100:1 turndown range to fill application needs up to approximately ten thousand pounds per square inch.

Differential pressure transmitters, in particular, are designed for specific pressure ranges and have limits as to how far the differential pressure transmitter can be ranged down. Further, many applications also require knowledge of the line pressure of the monitored process. For example, commercially available devices, such as the Model 3095 MV available from Rosemount Inc., of Chanhassen, Minn., measures differential pressure and line pressure in order to execute a flow calculation to provide process fluid flow measurement. While the use of a single absolute or gauge pressure sensor in conjunction with a differential pressure sensor has provided advantages in the past, such devices can cease to function if the absolute pressure sensor, or the differential pressure sensor fails, or if any of the pressures coupled to the pressure transmitter are outside of the selected measurement ranges.

SUMMARY

Reliability and accuracy in a pressure measurement transmitter are provided by employing a plurality of absolute or gauge pressure sensors operating in conjunction with a differential pressure sensor. A method is also provided to perform diagnostics based upon the readings of the three or more pressure sensors. Further, should one of the three or more pressure sensors fail, a reasonable estimate of the output of the failed sensor can be generated based upon the remaining sensors.

DETAILED DESCRIPTION

Figure 1:
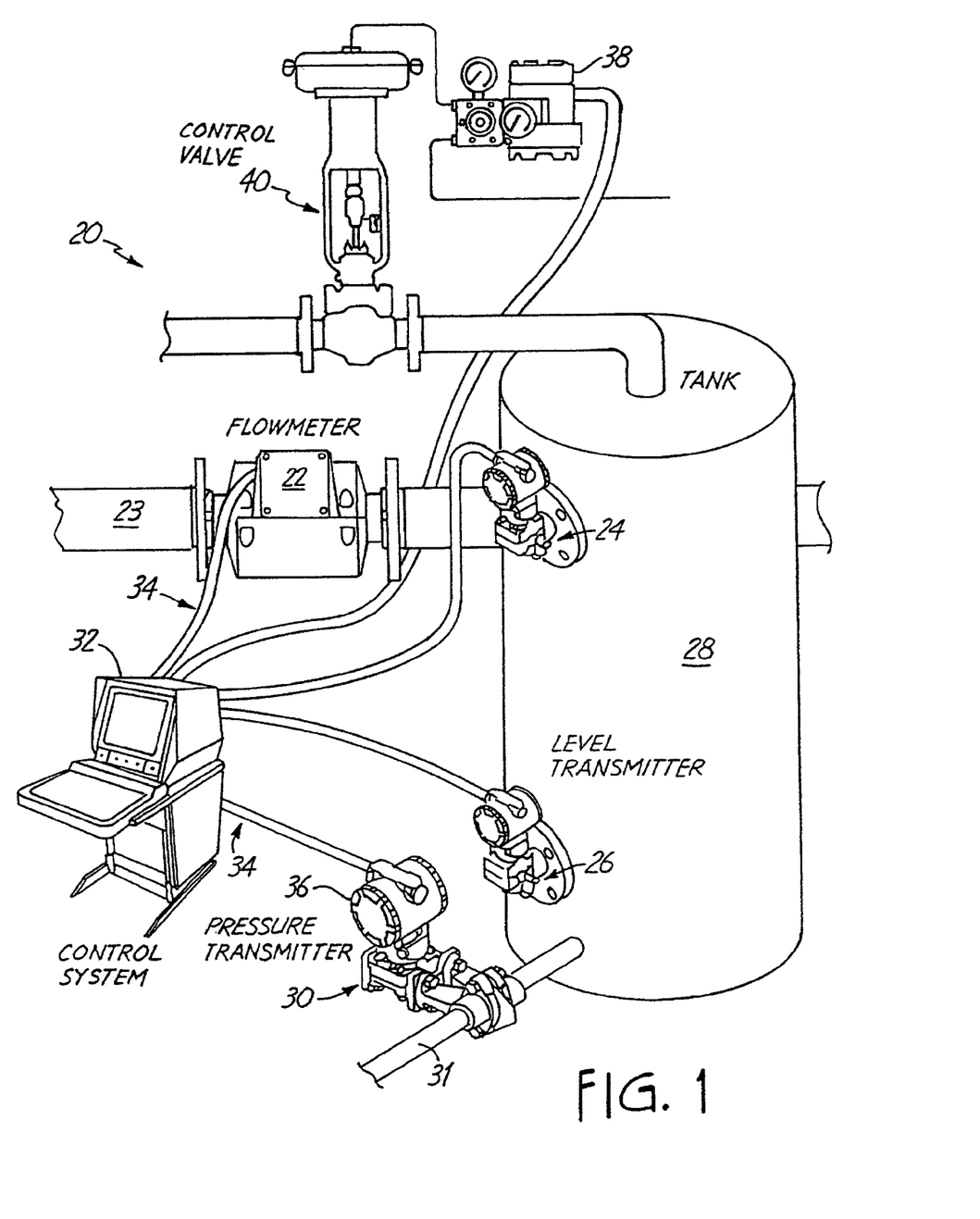
FIG. 1 is a diagrammatic view of typical process control environment for pressure transmitters.

FIG. 1 is a diagrammatic view of a typical environment for an industrial pressure transmitter. In FIG. 1, process variable transmitters such as flow meter 22 in process fluid line 23, level transmitters 24, 26 on tank 28 and integral orifice flow meter in process line 31 are shown electrically connected to control system 32. Process variable transmitters can be configured to monitor one or more process variables associated with fluids in a process plant such as slurries, liquids, vapors, and gasses in chemical, pulp, petroleum, gas, pharmaceutical, food and other fluid processing plants. The monitored process variables can include pressure, temperature, flow, level, pH, conductivity, turbidity, density, concentration, chemical composition or other properties of fluid. A process variable transmitter includes one or more sensors that can be either internal to the transmitter or external to the transmitter, depending on the installation needs of the process plant. Process variable transmitters generate transmitter outputs that represent the sensed process variable. Transmitter outputs are configured for transmission over relatively long distances to a controller or indicator via communication busses 34. In typical fluid processing plants, communication bus 34 can be a 4-20 mA current loop that powers the transmitter, a FOUNDATION™ Fieldbus connection, a HART (Highway Addressable Remote Transmitter) protocol connection, or a high speed Ethernet (HSE) or a fiber optic connection to a controller, control system or readout. Alternatively, communication bus 34 may be implemented as a wireless system. In transmitters powered by a process communication loop, power must be kept low in order to comply with intrinsic safety requirements in explosive environments.

In FIG. 1, integral orifice flow meter 30 includes pressure transmitter 36 coupled to process communication loop or communication bus 34. Level transmitters 24, 26 also include pressure transmitters. Control system 32 can be programmed to display process conditions to a human operator. Further control system 32 and can be programmed, or otherwise configured, to sense the process conditions and control the process via output devices such as current to pressure converter 38 and control valve 40, for example.

Figure 2:
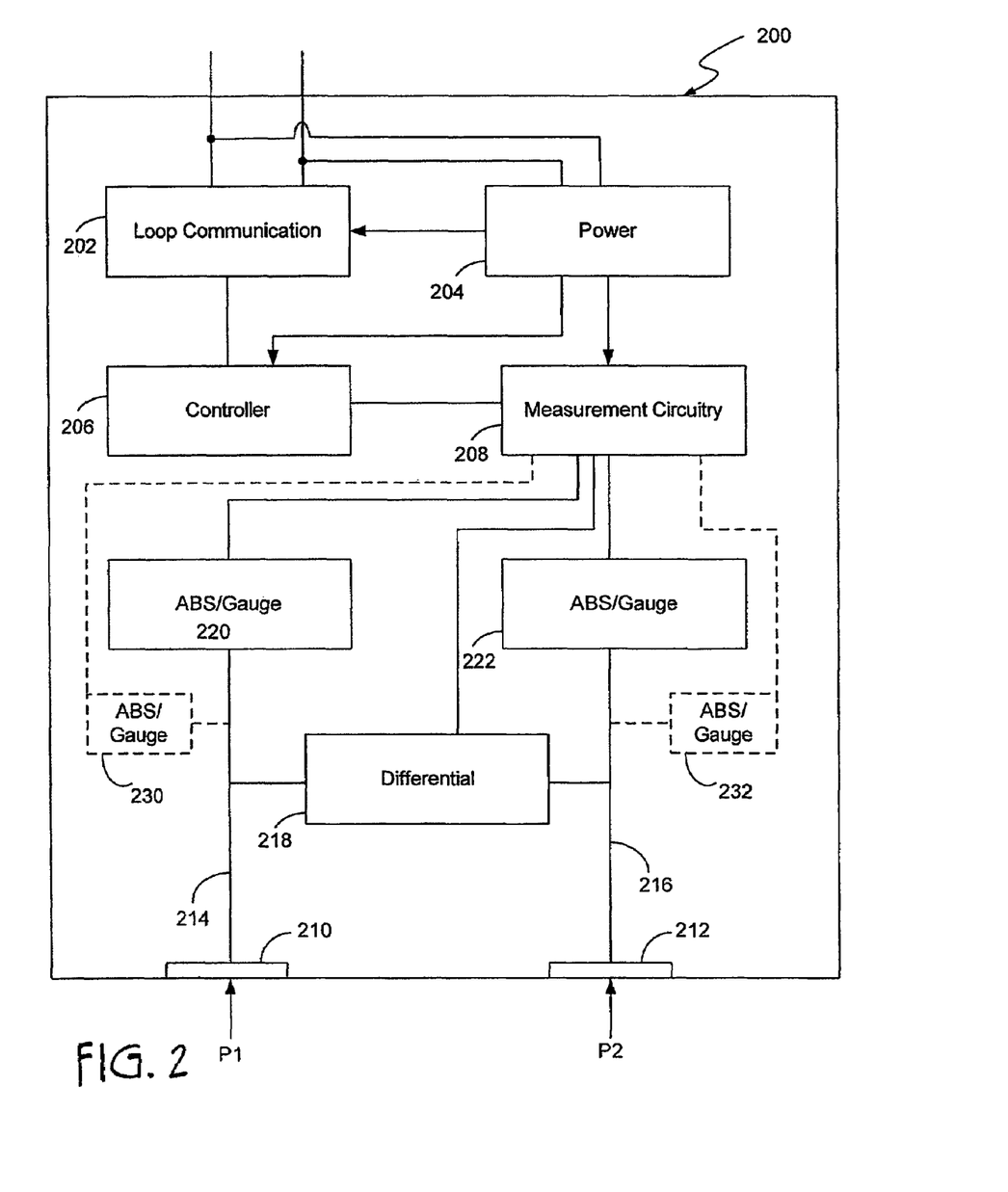
FIG. 2 is a block diagram of a differential pressure transmitter in accordance with an embodiment of the present invention.

FIG. 2 is a block diagram of a pressure transmitter in accordance with an embodiment of the present invention. Transmitter 200 includes loop communications module 202 configured to couple to a process communication loop or bus. Loop communication module 202 generates and/or receives signals in accordance with a process communication standard communication protocol. Loop communication module 202 is coupled to controller 206 thereby allowing controller 206 to interact with one or more devices on the process communication loop through module 202. Power module 204 is also coupled to the process communication loop or bus, and receives power and conditions, or otherwise adapts, the received power for provision to other electrical components within the transmitter. Power module 204 can allow the pressure transmitter to be wholly powered from electrical energy received through the loop. Alternatively, communication module 202 may be adapted for use according to a wireless system and protocol.

Measurement circuitry is coupled to power module 204, controller 206 and pressure sensors 218, 220, 222. Measurement circuitry receives operating power from module 204 and is configured to sense an electrical characteristic of each of sensors 218, 220 and 222 and provide an indication of the sensed characteristic to controller 206. Measurement circuitry 208 can include a known analog-to-digital converter. Additionally, measurement circuitry 208 can include a multiplexer to allow measurement circuitry 208 to couple to each of sensors 218, 220, and 222 individually, in turn. Measurement circuitry 208 can include any suitable circuitry or components that allow circuitry 208 to obtain measurements from sensors 218, 220 and 222. For example, if differential pressure sensor 218 is a capacitive pressure sensor, but absolute pressure sensors 220, 222 are resistive strain-gauge type sensors, then measurement circuitry 208 will include suitable capacitance and resistance sensing circuitry, as well as circuitry allowing the signals to be disambiguated from one another, such as a multiplexer. Those skilled in the art will recognize that embodiments of the present invention can be practiced by employing dedicated measurement circuitry for each sensor, or combinations thereof, and that such dedicated circuitry can be used in place of, or in combination with, a multiplexed configuration.

In this embodiment, absolute/gauge pressure sensor 220 is coupled to pressure P1 applied to process fluid inlet 210 by virtue of an isolation fluid within line 214. Similarly, absolute/gauge pressure sensor 222 is coupled to pressure P2 applied to process fluid inlet by virtue of isolation fluid within line 216. Differential pressure sensor 218 is coupled to lines 214 and 216 and provides an indication of the pressure difference between lines 214 and 216 to measurement circuitry 208. Transmitter 200 can include additional absolute or gauge pressure sensors coupled to each of lines 214, 216. Optional sensors 230, 232 are indicated in phantom in FIG. 2 as coupled to lines 214, 216, respectively. Optional sensor 230, 232 may be selected to have different pressure measurement ranges than sensors 220, 222, or they can simply provide redundancy. Additionally, optional sensors 230, 232 can be selected to provide additional and/or complementary functions relative to sensors 218, 220 and 222. For example, if sensors 220 and 222 are gage sensors, one or both of optional sensors 230, 232 could be an absolute pressure sensor. Additionally, if sensors 220 and 222 are absolute pressure sensors, an optional sensor 354 could be an atmospheric pressure sensor coupled to inlet 317 (shown in FIG. 3). Although inlet 317 is illustrated as a wiring inlet, inlet 317 may take any suitable form, and may, in fact, be a separate inlet than the wiring inlet.

Figure 3:
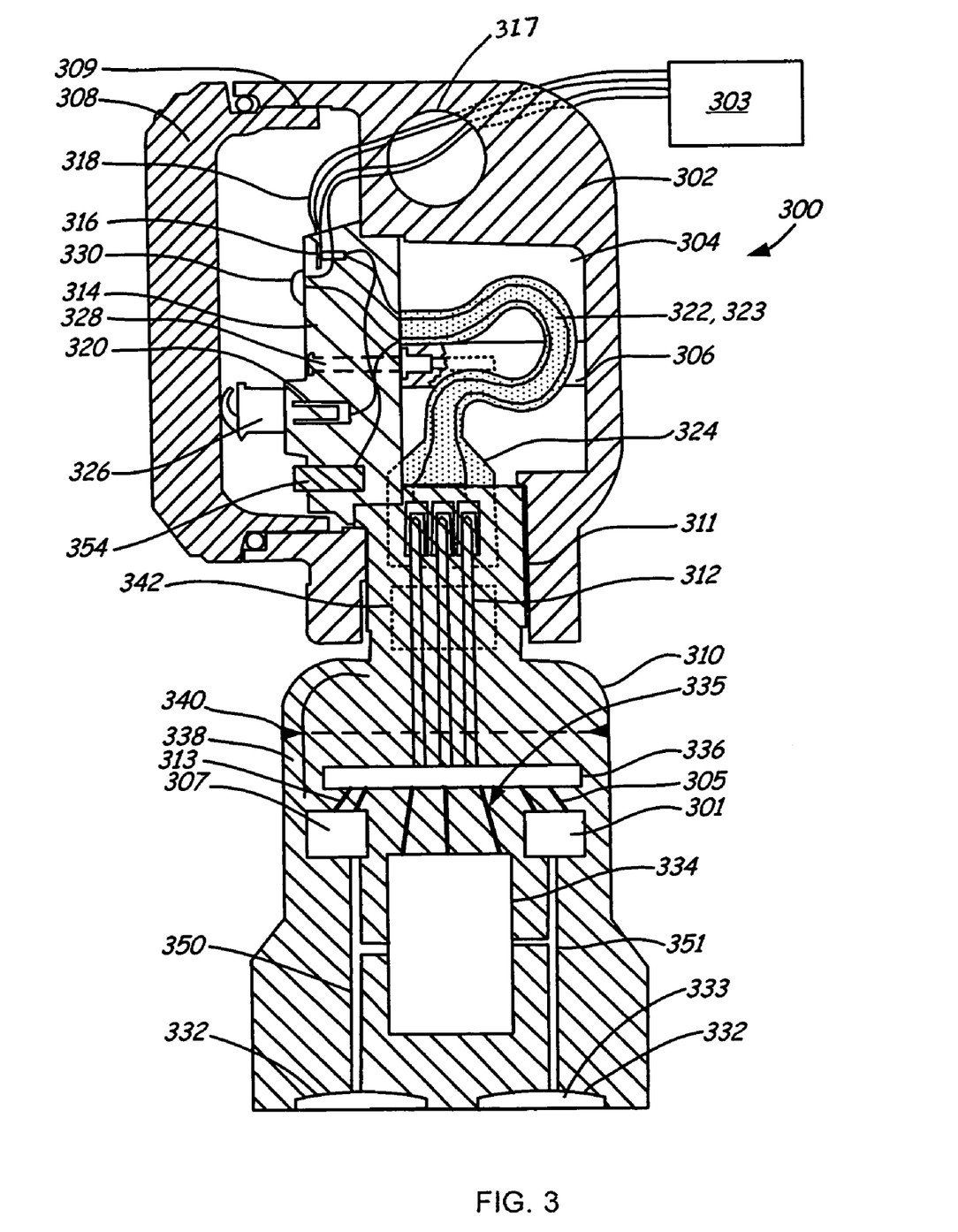
FIG. 3 is a diagrammatic view of dual pressure transmitter in accordance with an embodiment of the present invention.

FIG. 3 is a diagrammatic view of a pressure transmitter in accordance with an embodiment of the present invention. Transmitter 300 includes field wiring housing 302 that surrounds wiring compartment 304. The wiring housing 302 can be formed of a metal such as aluminum or stainless steel, or housing 302 can be formed of a suitable plastic. Wiring housing 302 preferably includes a vent or inlet 317 that couples atmospheric pressure to the interior of wiring housing 302. Preferably, mounting stand-offs 306 are formed inside the wiring compartment 304 and a compartment cover 308 is threaded and engages corresponding threads inside the wiring compartment as illustrated at 309. A permanently sealed transmitter assembly 310 is threaded and engages corresponding threads inside the wiring compartment as illustrated at 311. Transmitter assembly 310 is a pressure transmitter assembly and includes sealed isolator diaphragms 332, differential pressure sensor 334 absolute pressure sensors 301, 307 and one or more printed circuit boards 336. Differential pressure sensor 334, is coupled to circuit board 336 via leads 335. Absolute or gauge pressure sensors 307, 301 are coupled to circuit board 336 by leads 313, 305, respectively. Isolator diaphragms 332 in the process inlets are coupled to differential pressure sensor 334 by lines 350, 351, that are filled with a suitable isolator fluid, such as silicone oil. Line 351 also couples line pressure from one of the process inlets to absolute pressure sensor 301. Similarly, line 350 also couples line pressure from the other process inlet to absolute pressure sensor 307. Transmitter assembly 310 has a transmitter electrical connector 312 that is accessible inside wiring compartment 304. Preferably, transmitter assembly 310 has an outer metal housing 338 that is permanently welded shut at weld 340 and a hermetically sealed feedthrough 342 surrounding the transmitter electrical connector 312. Printed circuit board 336 inside transmitter assembly 310 is thus permanently sealed and protected from the atmosphere surrounding transmitter 300.

In this embodiment, transmitter 300 also includes an electrical connector 314. Electrical connector 314 includes terminals 316 that are adapted for electrical connection to field wiring 318, which couples the pressure transmitter to a control room, illustrated diagrammatically at 303, and/or to one or more other field devices. Field wiring 318 typically uses long distance signaling comprising HART serial communication over a two-wire 4-20 mA industrial control loop that energizes transmitter 300 and provides remote electrical transmission of process fluid variables sensed by transmitter assembly 310, but can also comprise various known industrial busses such as FOUNDATION™ Fieldbus, Profibus or other known communication protocols including wireless communication protocols. Screw 328 can mount electrical connector 314 to mounting stand-offs 306. Electrical connector 314 can also include sealed programming jumper assemblies 320 and sealed programming pushbutton switches 330. Jumper assemblies 320 each include removable jumper body 326 that can be inserted in one of several orientations for programming. Electrical connector 314 may also include a sealed cable 322 that terminates in a sealed plug 324 that plugs into the transmitter electrical connector 312 and seals to the body of transmitter assembly 310.

Pressure transmitter 300 optionally includes atmospheric pressure sensor 354 disposed within housing 302. Pressure sensor 354 senses pressure within housing 302, which is coupled to atmospheric pressure by virtue of inlet 317. Sensor 354 may be electrically coupled the sealed pressure transmitter assembly 310 via feedthrough 342. Thus, an indication of atmospheric pressure can be used by circuitry on circuit board 336 to reference any desired pressures to atmospheric pressure. Pressure sensor 354 may be any suitable type of pressure sensor including, without limitation, a capacitive pressure sensor, a resistive-strain gauge pressure sensor, a piezo-resistive pressure sensor, an optical pressure sensor, or any other suitable type of pressure sensor.

Transmitter 300 provides a pressure output over field wiring 318 and also provides indications of absolute pressure as measured with either, or both, of absolute pressure sensors 301, 307 over wiring 318. The line pressure output can be the sensed absolute pressure, a calculated gauge pressure using a serial communication signal received by transmitter 300, or both.

Circuit 336 receives an indication of differential pressure between the process inlets and provides an indication of differential pressure, or any suitable parameter based on the differential pressure, over wiring 318. Absolute/gauge pressure sensor 301 receives an indication of pressure within line 351 and provides such indication to circuit 336. Further, absolute/gauge pressure sensor 307 generates an indication of pressure within line 350 and provides such indication to circuit 336. Preferably each of sensors 301 and 307 sense the same type of pressure (e.g. absolute or gauge). Moreover, those skilled in the art will recognize that pressure sensors 301 and 307 can be absolute pressure sensors or gauge pressure sensors simply depending on whether they are referenced to a vacuum, or to atmospheric pressure. Further still, while FIG. 3 illustrates differential pressure sensor 334, and absolute pressure sensors 301 and 307 separately, they may, in fact, be part of one monolithic unit. Moreover, the pressure sensors may be constructed in accordance with any suitable pressure sensor manufacturing techniques, and may sense pressure in accordance with known, or later developed, pressure sensing techniques. For example, any or all of pressure sensors 334, 301 and 307 may be capacitive pressure sensors, resistive-strain gauge pressure sensors, piezo-resistive pressure sensors, optical pressure sensor, or any other suitable type of pressure sensor.

Figure 4:
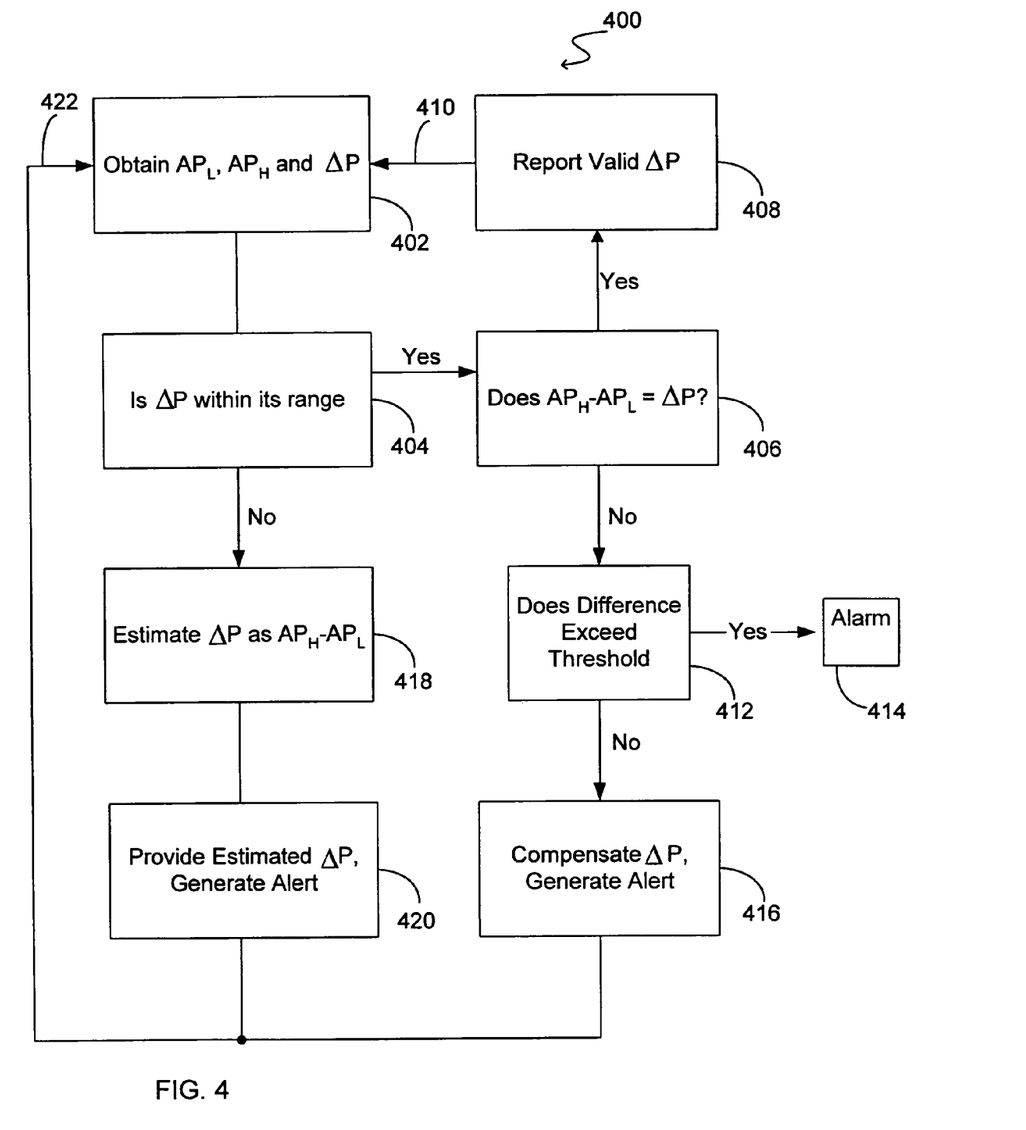
FIG. 4 is a flow diagram of a method of operating differential pressure transmitter having multiple absolute or gauge pressure sensors in accordance with an embodiment of the present invention.

FIG. 4 is a flow diagram of a method of operating pressure transmitter having multiple absolute or gauge pressure sensors in accordance with an embodiment of the present invention. Method 400 begins at block 402 where the pressure transmitter obtains high and low absolute pressure measurements ($AP_H$ and $AP_L$) as well as a differential pressure measurement. At block 404, the pressure transmitter determines whether the measured differential pressure is within the specified measurement range for the differential pressure sensor. If the measure differential pressure is within the specified range, control passes to block 406 where the pressure transmitter determines whether the quantity $AP_H$-$AP_L$ is essentially equal to the measured differential pressure, within the measurement accuracy of the absolute/gauge pressure sensors and the differential pressure sensor. If they are essentially equal, control passes to block 408 where the valid differential pressure is reported and control subsequently returns to block 402 via line 410. However, if, at block 406, quantity $AP_H$-$AP_L$ does not equal the measured differential pressure, then control passes to block 412 where the differential pressure transmitter determines whether the difference between the quantity $AP_H$-$AP_L$ and the measured differential pressure exceeds a selected threshold. If the threshold is exceeded, control passes to block 414 where the differential pressure transmitter generates an alarm condition indicating a fault. The generated alarm can be any suitable alarm either indicated locally at the pressure transmitter, such as a visual or audible alarm, and/or an alarm message that may be transmitted by the differential pressure transmitter along the process communication loop. In addition to generation of the alarm, an option can be provided, either locally or via interaction through a process control loop, to initiate sensor health diagnostics to locate or identify the cause.

If the threshold is not exceeded, control passes to block 416 where the differential pressure transmitter generates a compensated differential pressure and generates and alert indicating that the differential pressure data being provided is a compensated quantity. One example of compensation includes selecting a backup value, such the quantity $AP_H$-$AP_L$ and providing that as the differential pressure, and then also generating an alarm. Another example includes determining whether the measured differential pressure is at or near a limit of its effective measuring range, and discounting the weight of the differential pressure sensor signal value in a weighted average with the quantity $AP_H$-$AP_L$. Accordingly, as the differential pressure sensor begins to approach or operate beyond its specified range, the weight of its signals can be heavily discounted such that the compensated output becomes more and more focused upon the values provided by the absolute pressure sensors. Yet another example, includes examining the magnitude of recent changes of each quantity and discounting or not selecting the quantity that has changed the most, and subsequently generating an alarm. Thus, if one sensor should become an open circuit, the transmitter would immediately switch to the other measurement regime, and would generate an alarm. These are simply examples of ways in which compensation can be provided. Certainly other mathematical formulas and techniques are within the spirit and scope of embodiments of the present invention.

Referring to block 404, if the measured differential pressure is not within its range, control passes to block 418 where the differential pressure transmitter provides an estimate of the differential pressure as the difference between $AP_H$ and $AP_L$. At block 420, the estimated differential pressure is provided and an alert, indicating that the quantity is an estimate is provided. FIG. 4 illustrates that control from blocks 416 and 420 returns to block 402 via line 422.

Figure 5:
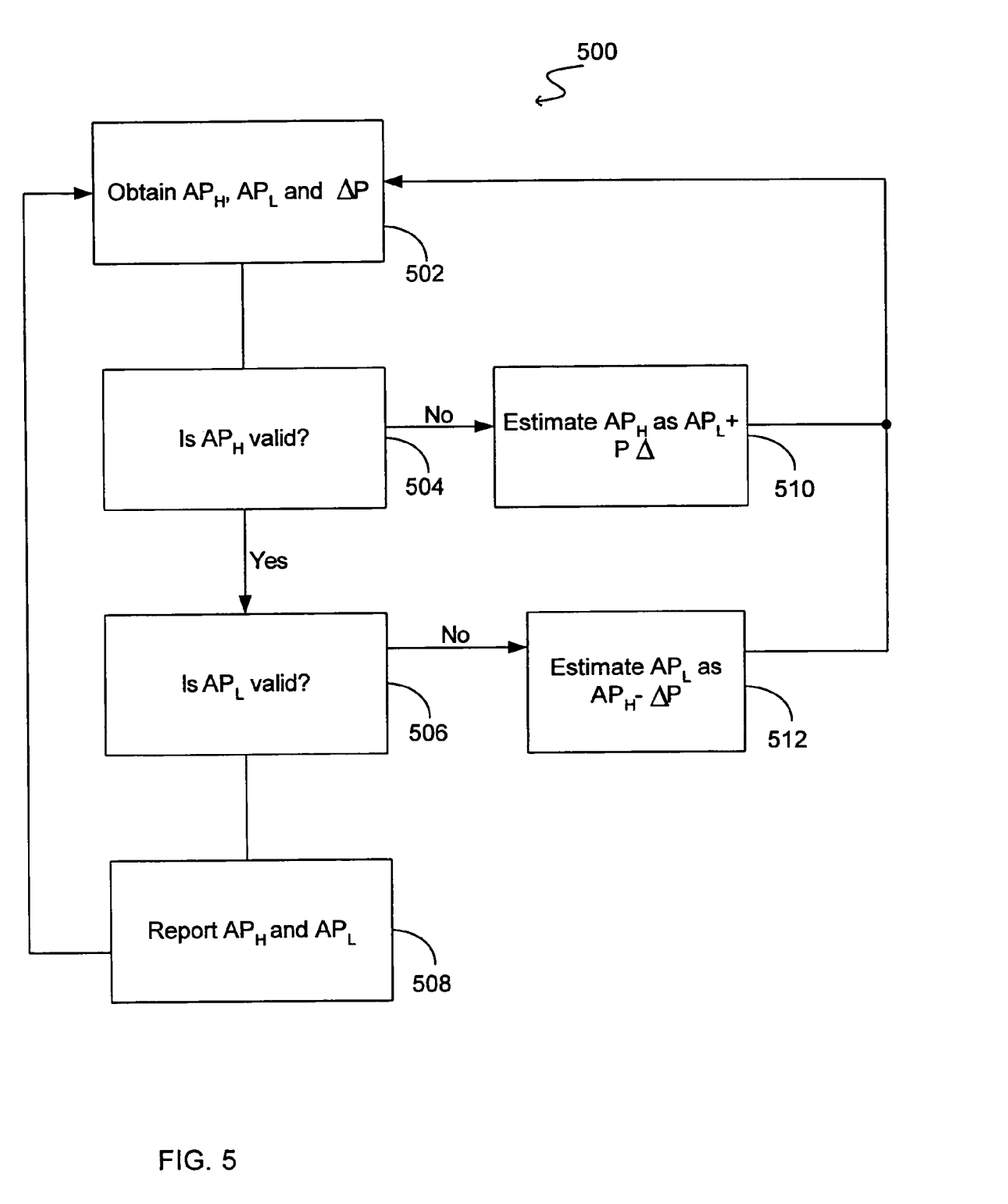
FIG. 5 is a flow diagram of a method for obtaining and reporting absolute or gauge pressure values in accordance with an embodiment of the present invention.

FIG. 5 is a flow diagram of a method for obtaining and reporting absolute or gauge pressure values in accordance with an embodiment of the present invention. Method 500 begins at block 502 which is substantially equivalent to block 402 illustrated with respect to method 400. Essentially, the pressure transmitter obtains sensor signals from both absolute/gauge pressure sensors as well as the differential pressure sensor. Control then passes to block 504 which determines if the high absolute pressure sensor signal ($AP_H$) is valid. This may be as simple as checking to determine if the sensor is shorted, or an open circuit. Further, this validity check may include comparing the current sensor value with recently acquired sensor values to determine if a significant jump or change has occurred in the value which jump or change is not reflected in the other two pressure sensor values. If block 504 determines that $AP_H$ is valid, control passes to block 506 where the pressure transmitter performs a similar analysis on the low absolute/gauge pressure sensor value ($AP_L$). If that value is valid as well, control passes to block 508 where both absolute/gauge pressure values are reported, or otherwise used in calculations of the pressure transmitter. However, if one of the absolute or gauge pressure sensors has failed, an estimate of the failed sensor's value can be estimated. For example, at block 504, if $AP_H$ is not valid, control passes to block 510 where an estimate of $AP_H$ is provided as the sum of the low absolute or gauge pressure ($AP_L$) and the differential pressure measurement value. Similarly, at block 506, if the low absolute or gauge pressure sensor signal is invalid, control passes from block 506 to block 512 where an estimate of $AP_L$ is provided as $AP_H$ minus the differential pressure.

It is known to use line pressure to compensate for differential pressure measurements. However, embodiments of the present invention provide the ability to generate such compensation even in the event that one of the absolute or gauge pressure sensors should fail. Moreover, high level diagnostics are provided by essentially monitoring all three values (both absolute or gauge pressure sensor signals and the differential pressure sensor signal) during operation. Thus, the pressure transmitter can provide the differential pressure as well as the line pressure. The differential pressure range covered is essentially the range covered by the differential pressure cell and up to a differential pressure of full line pressure on one port and zero pressure on the other port as calculated by the difference of absolute or gauge pressure sensors. In the event that the differential pressure sensor and/or its associated measurement circuitry fails, the transmitter can go into a limp mode to calculate and provide an estimate of differential pressure as the difference between the absolute or gauge pressure sensors. In some configurations, this will result in a reduced accuracy differential pressure measurement as compared to the value from the differential pressure sensor, but could allow continued operation. However, the degree to which the accuracy is reduced depends upon the sensor configuration used. The pressure transmitter would also generate an alarm or alert to the control system or a technician indicative of the failure. In the event that one of the absolute or gauge pressure sensors fail, the transmitter can also go into limp mode and that value can be estimated, as set forth above, based upon the remaining absolute or gauge pressure sensor signal and the differential pressure sensor signal. Again, alarms or alerts would indicate such limp mode to the control system or a technician.

Although the present invention has been described with reference to preferred embodiments, workers skilled in the art will recognize that changes may be made in form and detail without departing from the spirit and scope of the invention. For example, although the present invention has been described primarily with respect to a pair of absolute or gauge pressure sensors used in conjunction with a single differential pressure sensor, additional absolute or gauge pressure sensors can also be used to increase the effective measurement range of such absolute or gauge measurements.

What is claimed is:

1. A pressure transmitter comprising:
a first process fluid pressure inlet adapted to receive a first process fluid pressure;
a second process fluid pressure inlet adapted to receive a second process fluid pressure;
a differential pressure sensor coupled to the first and second process fluid pressures;
a first pressure sensor coupled to the first process fluid pressure;
a second pressure sensor coupled to the second process fluid pressure; and
circuitry operably coupled to the first and second pressure sensors, and coupled to the differential pressure sensor, the circuitry configured to measure the first and second process pressures as well as the differential pressure and provide an indication relative to the measurements over a process communication loop.

2. The transmitter of claim 1, wherein the first pressure sensor is an absolute pressure sensor.

3. The transmitter of claim 2, wherein the second pressure sensor is an absolute pressure sensor.

4. The transmitter of claim 3, and further comprising an atmospheric pressure sensor.

5. The transmitter of claim 2, wherein the second pressure sensor is a gage pressure sensor.

6. The transmitter of claim 1, wherein the first pressure sensor is a gauge pressure sensor.

7. The transmitter of claim 6, wherein the second pressure sensor is a gauge pressure sensor.

8. The transmitter of claim 7, and further comprising an absolute pressure sensor coupled to one of the first and second process fluid pressure inlets.

9. The transmitter of claim 1, and further comprising at least one additional pressure sensor coupled to one of the first and second process fluid pressures.

10. The transmitter of claim 1, wherein the circuitry includes a power module configured to receive electrical energy from a process communication loop to wholly power the transmitter with energy received from the process communication loop.

11. The transmitter of claim 1, wherein the circuitry is configured to perform at least one diagnostic function based upon signals from the first, second and differential pressure sensors.

12. The transmitter of claim 1, wherein the first, second and differential pressure sensors are embodied within a monolithic sensor unit.

13. A method of operating a pressure transmitter having a first process fluid inlet configured to receive a first process fluid pressure and a second process fluid inlet configured to receive a second process fluid pressure, the method comprising;
measuring the first process fluid pressure with a first pressure sensor of the transmitter;
measuring the second process fluid pressure with a second pressure sensor of the transmitter;
measuring a differential pressure of the first and second process fluid pressures with a differential pressure sensor of the transmitter; and
determining whether the measured differential pressure is similar to a difference between the measured first and second fluid pressures.

14. The method of claim 13, and further comprising determining if the measured differential pressure is within a selected threshold value of a difference of the first and second measured process fluid pressures.

15. The method of claim 13, and further comprising providing an estimate of differential pressure and an alert if the measured differential pressure is within a selected threshold value of a difference of the first and second measured process fluid pressures.

16. The method of claim 13, and further comprising providing an alarm if the measured differential pressure is not within a selected threshold value of a difference of the first and second measured process fluid pressures.

17. The method of claim 13, wherein the transmitter's differential pressure process value output is a function of the differential pressure measurement, and the measured first and second process fluid pressures.

18. The method of claim 13, and further comprising wholly powering the pressure transmitter with electrical energy received from a process communication loop.

19. A method of operating a pressure transmitter having a first process fluid inlet configured to receive a first process fluid pressure and a second process fluid inlet configured to receive a second process fluid pressure, the method comprising;
measuring the first process fluid pressure with a first pressure sensor of the transmitter and determining if the first measured process fluid pressure is valid;
measuring the second process fluid pressure with a second pressure sensor of the transmitter and determining if the second measured process fluid pressure is valid;
measuring a differential pressure between the first and second process fluid pressures, and determining if the differential pressure is valid; and
providing an estimate of a process fluid pressure in the event of an invalid sensor signal as a function of at least two other valid sensor signals.

20. The method of claim 19, and further comprising providing an alert if any of the sensor signals is not valid.

21. The method of claim 19, wherein determining if the differential pressure is valid includes determining if the differential pressure exceeds a measurement range of the differential pressure sensor.

22. The method of claim 19, and further comprising wholly powering the pressure transmitter with electrical energy received from a process communication loop.

23. A pressure transmitter comprising:
a first process fluid pressure inlet adapted to receive a first process fluid pressure;
a second process fluid pressure inlet adapted to receive a second process fluid pressure;
a differential pressure sensor coupled to the first and second process fluid pressures;

a first pressure sensor coupled to the first process fluid pressure;
a second pressure sensor coupled to the second process fluid pressure; and
circuitry operably coupled to each of the first pressure sensor, the second pressure sensor, and the differential pressure sensor, wherein the circuitry is configured to make independent measurements from each of at least three sensors comprising the first pressure sensor, the second pressure sensor, and the differential pressure sensor, and to provide an indication relative to the measurements over a process communication loop.

* * * * *